(12) United States Patent
Stoeckle et al.

(10) Patent No.: US 11,161,339 B2
(45) Date of Patent: Nov. 2, 2021

(54) METHOD FOR DETERMINING THE NIP BETWEEN A PRINT HEAD OF AN INKJET PRINTING APPARATUS AND A PRINTING SUBSTRATE

(71) Applicant: Oce Holding B.V., Venlo (NL)

(72) Inventors: Ulrich Stoeckle, Munich (DE); Christoph Rummelsberger, Ismaning (DE); Florian Hitzlsperger, Poing (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 16/713,349

(22) Filed: Dec. 13, 2019

(65) Prior Publication Data

US 2020/0189269 A1 Jun. 18, 2020

(30) Foreign Application Priority Data

Dec. 14, 2018 (DE) .......................... 102018132204.6

(51) Int. Cl.
*B41J 2/045* (2006.01)
*B41J 2/155* (2006.01)

(52) U.S. Cl.
CPC ....... *B41J 2/04556* (2013.01); *B41J 2/04593* (2013.01); *B41J 2/155* (2013.01)

(58) Field of Classification Search
None
See application file for complete search history.

(56) References Cited

U.S. PATENT DOCUMENTS

| 6,257,689 | B1 | 7/2001 | Yonekubo |
| 7,445,302 | B2 | 11/2008 | Edwards et al. |
| 8,864,266 | B2 * | 10/2014 | Suzuki .................. B41J 2/2125 347/15 |
| 9,211,743 | B2 * | 12/2015 | Izuo ......................... B41J 11/20 |
| 2006/0274098 | A1 | 12/2006 | Shibata et al. |
| 2011/0249062 | A1 * | 10/2011 | Nakano ................. B41J 2/2135 347/37 |

FOREIGN PATENT DOCUMENTS

| DE | 69937660 T2 | 1/2009 |
| EP | 0503871 A2 | 9/1992 |

OTHER PUBLICATIONS

German Office Action dated May 31, 2019, for Application No. 10 2018 132 204.6.

* cited by examiner

*Primary Examiner* — Alejandro Valencia
(74) *Attorney, Agent, or Firm* — Schiff Hardin LLP

(57) ABSTRACT

In order to determine the nip between a print head and a printing substrate in an ink printing apparatus, ink droplets of a first and second size are simultaneously fired toward the printing substrate by different nozzles of a nozzle row of the print head given a predetermined feed velocity of the printing substrate, whereby print dots of a first size are generated on the printing substrate in a first two print dot row and print dots of a second size are generated on the printing substrate in a second two print dot row. The clearance of the first two print dot row from the second two print dot row is subsequently measured, and the size of the nip is determined from the measured clearance.

13 Claims, 1 Drawing Sheet

METHOD FOR DETERMINING THE NIP BETWEEN A PRINT HEAD OF AN INKJET PRINTING APPARATUS AND A PRINTING SUBSTRATE

CROSS REFERENCE TO RELATED APPLICATIONS

This patent application claims priority to German Patent Application No. 102018132204.6, filed Dec. 14, 2018, which is incorporated herein by reference in its entirety.

BACKGROUND

Field

The disclosure is directed to a method and system for determining and adjusting the clearance of a print head of an ink printing apparatus from a printing substrate (nip).

Related Art

Inkjet printing apparatuses may be used for single- or multicolor printing to a printing substrate, for example a single sheet or a printing substrate in the form of a band, made of the most varied materials, for example a paper web. The design of such inkjet printing apparatuses is known; see for example U.S. Pat. No. 7,445,302 B2. Ink printing apparatuses which, for example, operate according to the drop-on-demand (DoD) principle have as a printing unit a print head or a plurality of print heads with nozzles comprising ink channels, the activators of which nozzles—controlled by a printer controller, excite ink droplets in the direction of the printing substrate, which droplets are deflected onto the printing substrate in order to apply print dots there for a print image. The activators may generate ink droplets thermally (bubble jet) or piezoelectrically.

In an ink printing apparatus, the print quality is determined significantly by the distance of the print head from the printing substrate. This distance, referred to as a nip in the following, may be predetermined mechanically but may change during the printing operation, for example because of fluctuations in the flight of the printing substrate due to folding or undulation of said printing substrate. For example, given a larger nip, the droplet positioning errors on the printing substrate become greater and the print quality therefore decreases.

In EP 0 503 871 A2, an ink printing apparatus is described in which the nip is checked. For this, the voltage applied to the piezoelements of the ink channels is measured, and the measurement result is compared with a nominal voltage that is applied to the piezoelements if the nip has the correct value.

From U.S. Pat. No. 7,445,302 B2, given an ink printing apparatus a method is known according to which the size of the nip may be determined, in particular between the nozzles of the print head and a printing substrate. For this, the print head prints a print image onto the moving printing substrate given a first nip. The displacement of the position of the print image on the printing substrate is measured (first measurement value). The nip is subsequently increased by a predetermined value, and then the print image is again printed onto the printing substrate and the displacement of the position of this print image given the modified nip is measured (second measurement value). The nip between print head and printing substrate may be calculated from the known measurement of the modification of the nip and the measurement values.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
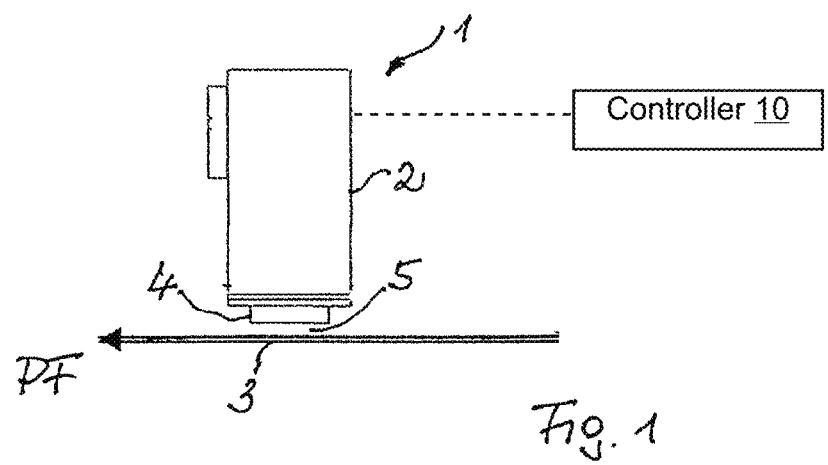
FIG. 1 illustrates a print head arrangement in its position relative to the printing substrate.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide a method for determining the clearance of a print head of an ink printing apparatus from a printing substrate (nip). The clearance of the print head from the printing substrate may be adjusted with the aid of the determined clearance.

In the present disclosure, the clearance of the print head from the printing substrate is referred to as a nip.

In an exemplary embodiment, to determine the nip between a print head and a printing substrate in an ink printing apparatus, ink droplets of a first and second size are simultaneously fired toward the printing substrate by different nozzles of a nozzle row of the print head, given a predetermined feed velocity of the printing substrate. In this example, print dots of a first size are generated on a printing substrate in a first print dot row and print dots of a second size are generated on a printing substrate in a second print dot row. In an exemplary embodiment, the clearance of the first print dot row from the second print dot row is subsequently measured, and the size of the nip is determined from the measured clearance. In an exemplary embodiment, the known values of the print speed, droplet velocity, and/or droplet size are used as well.

The device according to the disclosure provides the following advantages:

The nip between a print head and a printing substrate may be determined by evaluating the position of print dot rows printed by the print head onto the printing substrate, whose clearance may be measured with, for example, the aid of a camera given use of an image processing software.

If, given a known nip, the nominal clearance of the print dot rows is known, given an impermissible change of the nip—and therefore of the clearance of the print dot rows from one another—the position of the print head relative to the printing substrate may be changed so that the real clearance of the measured print dot rows corresponds to the nominal clearance, without the nip needing to be calculated.

The design of a print head arrangement 1 with, for example, one print head 2 is first explained with the aid of FIG. 1. The print head 2 is arranged above a printing substrate 3 (for example a printing substrate 3 in the form of a band) that is transported in the direction of the arrow PF, wherein nozzles 1 of the print head 2 are aligned toward the printing substrate 3. In an exemplary embodiment, the print head 2 is configured as the print head described in U.S. Pat. No. 7,445,302 B2. A nip 5 exists between the nozzles 4 of the print head 2 and the printing substrate 3, across which nip 5 the ink droplets fired by the nozzles 4 arrive at the printing substrate 3. In an exemplary embodiment, the size of the nip 5 should not change during the printing operation, since otherwise droplet positioning errors may occur on the printing substrate 3 and therefore the print quality would degrade.

Figure 2:
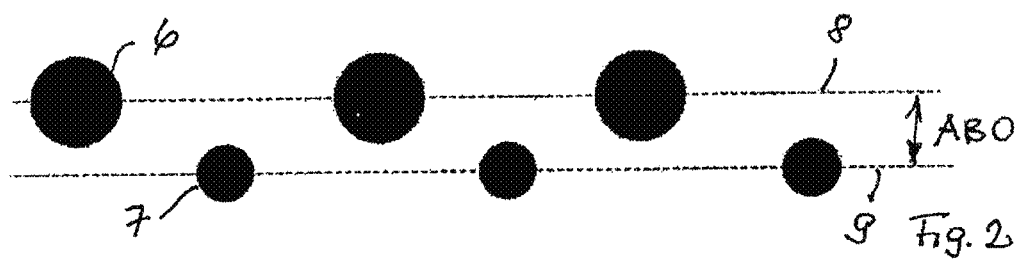
FIG. 2 illustrates two print dot rows according to an exemplary embodiment, if, given a correct nip, different nozzles of a nozzle row of a print head have simultaneously printed dots of two different sizes onto the moving printing substrate.
Figure 3:
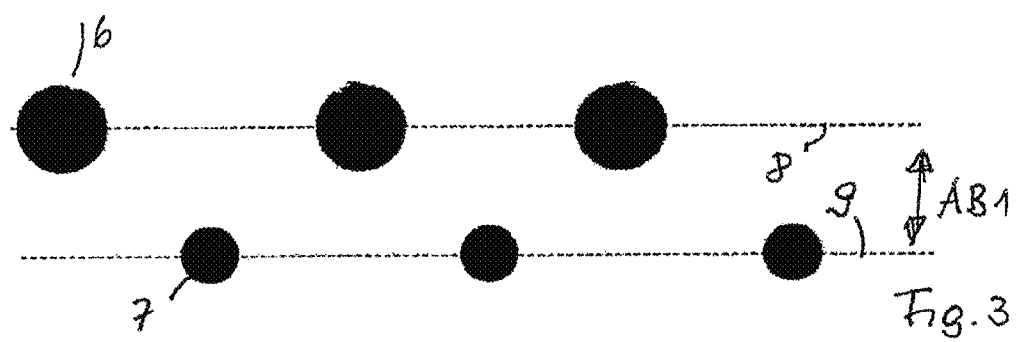
FIG. 3 illustrates two print dot rows according to an exemplary embodiment, if, given too large a nip, different nozzles of a nozzle row of the print head have simultaneously printed dots of two different sizes onto the moving printing substrate.
Figure 4:
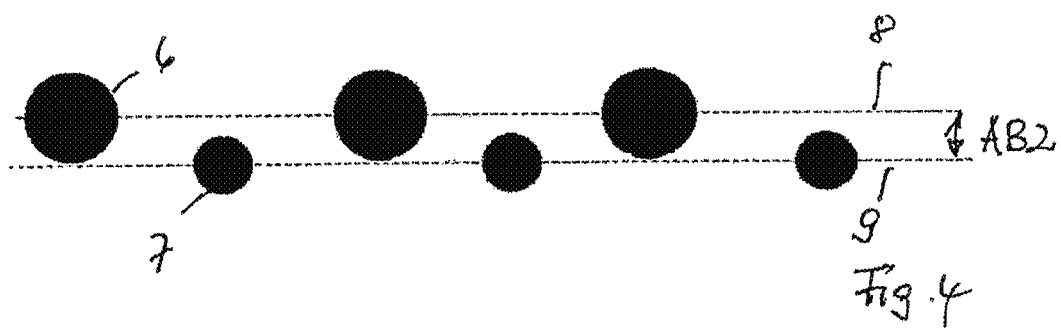
FIG. 4 illustrates two print dot rows according to an exemplary embodiment, if, given too small a nip, different nozzles of a nozzle row of the print head have simultaneously printed dots of two different sizes onto the moving printing substrate.

FIG. 2 through 4 show as an example a respective print image in which ink droplets of two droplet sizes have been fired from different nozzles 4 of a nozzle row of the print head 2 onto the printing substrate 3, transported at the feed velocity, with the same print timing. In an exemplary embodiment, the controller 10 is configured to control the print head 2 to fire the ink droplets from the nozzles 4, control the feed velocity, and/or control the print timing. The controller 10 can include processor circuitry that is configured to perform one or more operations and/or functions of the controller 10. For example, successive nozzles 4 of the nozzle row fire simultaneously, in alternating order, a large, fast ink droplet to generate a first print dot 6 and a small, slow ink droplet to generate a second print dot 7 on the printing substrate 1. Due to the different droplet velocity because of the different ink droplet sizes, a first print dot row 8 with larger print dots 6 and a second print dot row 9 with smaller print dots 7 are generated on the moving printing substrate 3. For example, each print dot 6 of the first print dot row 8 is generated by a fast, large ink droplet, and each print dot 7 of the first print dot row 9 is generated by a small, slow ink droplet. FIG. 2 through 4 thereby show that the print dot rows 8 and 9 are situated in chronological series on the printing substrate 3, and thus a clearance AB exists between the print dot rows 8, 9.

FIG. 2 shows the instance that the nip 5 has the nominal size. The two print dot rows 8, 9 then have the nominal clearance AB0.

FIG. 3 shows the example in which the nip 5 is too large. In comparison to FIG. 2, the other operating conditions have been retained. The clearance AB1 of the two print dot rows 8, 9 on the printing substrate 3 is now larger in comparison to the example of FIG. 2.

FIG. 4 shows the example that the nip 5 is smaller in comparison to FIG. 2. Given otherwise identical operating conditions in comparison to FIG. 2, the clearance AB2 of the two print dot rows 8, 9 has become smaller.

The size of the nip 5 between print head 2 and printing substrate 3 may thus be concluded from the actual clearance AB of the print dot rows 8, 9 on the printing substrate 3, given the same operating conditions. In the printing operation, in a test printing it may thus be established—for example given a worsening print image—whether the given nip 5 still corresponds to the nominal nip AB0. If this is not the case, the nip 5 may be modified in the direction toward the nominal nip AB0 by displacing the print head 2. This may take place in a control process (e.g. under the control of the controller 10) in which the position of the print head 2, and therefore of the nip 5, relative to the printing substrate 3 is varied until a printed pattern displays the instance of FIG. 2, in which the nip 5 has the size AB0.

However, it is also possible to calculate the nip 5 from the clearance AB of the two print dot rows 8, 9 and from the known conditions, the print speed and droplet velocity, in order to then adjust the size of the nip 5, for example by displacing the print head 2 according to the result of a calculation. In an exemplary embodiment, the controller 10 is configured to calculate the nip 5 and adjust the size of the nip 5.

To determine the clearance AB of the print dot rows 8, 9 from one another, a digital image of the print dot rows 8, 9 may be made in a known manner by a camera, which image is then evaluated with the aid of a known image processing software. In an exemplary embodiment, the camera is communicatively coupled to the controller 10, and the controller 10 can be configured to control the camera and perform one or image processing operations on digital images from the camera.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 print head arrangement
2 print head
3 printing substrate
4 nozzle
5 nip
6 print dots
7 print dots
8 print dot row
9 print dot row
10 controller
AB clearance
PF feed direction of the printing substrate

The invention claimed is:
1. A method for determining the nip between a print head and a printing substrate in an ink printing apparatus, the method comprising:
simultaneously firing ink droplets of first and second sizes toward the printing substrate, by nozzles of a nozzle row of the print head, given a predetermined feed velocity of the printing substrate, to generate print dots of a first ink droplet size and print dots of a second ink droplet size on the printing substrate, the first ink droplet size being different than the second ink droplet size;
measuring, in a feed direction of the printing substrate, a clearance of the first print dots from the second print dots; and
determining a size of the nip between the print head and the printing substrate based on the measured clearance.

2. The method according to claim 1, wherein the generation of the print dots of the first size and print dots of the second size comprises printing, onto the printing substrate:
a first print dot row of the print dots associated with the first ink droplet size; and
offset in the feed direction of the printing substrate, a second print dot row of the print dots associated with the second ink droplet size is printed onto the printing substrate.

3. The method according to claim 2, wherein the size of the nip between the print head and the printing substrate is determined based on the clearance of the first and the second print dot rows.

4. The method according to claim 2, wherein determining the size of the nip comprises:
optically scanning the first and second print dot rows to generate optical scan values;
evaluating the optical scan values, using image processing, to determine the clearance between the first and second print dot rows.

5. The method according to claim 4, wherein the size of the nip between the print head and the printing substrate is calculated based on:
the measured clearance between the first and the second print dot rows; and
print speeds and droplet velocities of the ink droplets of first and second size.

6. The method according to claim 4, further comprising:
comparing the measured clearance of the first and the second print dot rows with a predetermined nominal clearance; and
adjusting the nominal clearance based on a deviation of the nip between the print head and the printing substrate.

7. A non-transitory computer-readable storage medium with an executable program stored thereon, that when executed, instructs a processor to perform the method of claim 1.

8. A printer, comprising:
a print head including a nozzle row with a plurality of nozzles, a distance between the print head and a printing substrate defining a nip; and a controller that is configured to simultaneously fire ink droplets of a first and second size toward the printing substrate given a predetermined feed velocity of the printing substrate to:

control the print head to generate print dots of a first ink droplet size and print dots of a second ink droplet size on the printing substrate, the first ink droplet size being different than the second ink droplet size;

measure, in a feed direction of the printing substrate, a clearance of the first print dots from the second print dots; and determine a size of the nip between the print head and the printing substrate based on the measured clearance.

9. The printer according to claim 8, wherein the generation of the print dots of the first size and print dots of the second size comprises printing, onto the printing substrate:

a first print dot row of the print dots associated with the first ink droplet size; and offset in the feed direction of the printing substrate, a second print dot row of the print dots associated with the second ink droplet size is printed onto the printing substrate.

10. The printer according to claim 9, wherein the size of the nip between the print head and the printing substrate is determined based on the clearance of the first and the second print dot rows.

11. The printer according to claim 9, where determining the size of the nip comprises:

optically scanning the first and second print dot rows to generate optical scan values; and evaluating the optical scan values, using image processing, to determine the clearance between the first and second print dot rows.

12. The printer according to claim 11, wherein the size of the nip between the print head and the printing substrate is calculated based on:

the measured clearance between the first and the second print dot rows; and print speeds and droplet velocities of the ink droplets of first and second size.

13. The printer according to claim 11, wherein the controller is configured to:

compare the measured clearance of the first and the second print dot rows with a predetermined nominal clearance; and adjust the nominal clearance based on a deviation of the nip between the print head and the printing substrate.

* * * * *